US012627567B2

(12) United States Patent
Guo et al.

(10) Patent No.: US 12,627,567 B2
(45) Date of Patent: May 12, 2026

(54) ELECTRICAL APPLIANCE ASSEMBLY FOR MULTICLIENT NETWORKING, AND PERIPHERAL DEVICES

(71) Applicant: TECHTRONIC CORDLESS GP, Anderson, SC (US)

(72) Inventors: Xi Guo, Dongguan (CN); Chao Wen, Dongguan (CN); Hai Bo Ma, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 149 days.

(21) Appl. No.: 18/436,987

(22) Filed: Feb. 8, 2024

(65) Prior Publication Data

US 2024/0275686 A1 Aug. 15, 2024

(30) Foreign Application Priority Data

Feb. 13, 2023 (CN) .......................... 202310158539.9

(51) Int. Cl.
*H04L 41/12* (2022.01)
*G16Y 40/35* (2020.01)

(52) U.S. Cl.
CPC .............. *H04L 41/12* (2013.01); *G16Y 40/35* (2020.01)

(58) Field of Classification Search
CPC ............ G16Y 40/35; H01M 2010/4278; H02J 7/00032; H02J 7/00036; H04L 41/12; H04L 67/12
See application file for complete search history.

(56) References Cited

U.S. PATENT DOCUMENTS

| | | |
|---|---|---|
| 2016/0046199 A1 | 2/2016 | Butler et al. |
| 2016/0087685 A1 | 3/2016 | Brumley et al. |
| 2021/0165380 A1* | 6/2021 | Zhang ................. H04L 12/2825 |

FOREIGN PATENT DOCUMENTS

CN 205427503 U 8/2016

OTHER PUBLICATIONS

Extended European Search Report for Application No. 24157198.3 dated Jul. 18, 2024 (8 pages).

* cited by examiner

*Primary Examiner* — Jason D Recek
(74) *Attorney, Agent, or Firm* — Michael Best & Friedrich LLP

(57) ABSTRACT

An electrical appliance assembly for multiclient networking, comprising an electrical appliance and a battery unit, wherein the electrical appliance is configured to obtain electric energy from the battery unit or provide electric energy to the battery unit, wherein the electrical appliance, as a first client, comprises a first communication interface and a second communication interface, wherein the first communication interface is configured to communicate with a peripheral device, and the second communication interface is configured to communicate with the battery unit. The battery unit, as a second client, comprises a third communication interface and a fourth communication interface, wherein the third communication interface is configured to communicate with a peripheral device, and the fourth communication interface is configured to communicate with the electrical appliance.

24 Claims, 8 Drawing Sheets

| Destination ID | Data | Source ID | Check |
|---|---|---|---|

Fig. 2

ELECTRICAL APPLIANCE ASSEMBLY FOR MULTICLIENT NETWORKING, AND PERIPHERAL DEVICES

TECHNICAL FIELD

Embodiments disclosed herein generally relate to an electrical appliance assembly for multiclient networking, and corresponding peripheral devices.

BACKGROUND ART

Various electrical apparatuses, such as grinders, cutting machines, electric drills, and corresponding energy conversion apparatuses and power supply apparatuses, are widely used in people's daily life and work as electrical appliances that can provide various conveniences. With the rapid development of Internet technology, the Internet of Things (IoT) technology based on Internet technology has developed rapidly, and remarkable achievements have been made in the fields of intelligent transportation, smart homes, public security, etc. A pressing need has arisen to integrate more electrical appliances into the Internet of Things technology, thereby making people's lives and work more convenient and efficient.

In recent years, electric tools have emerged that are embedded with Internet of Things technologies, for example, wireless communication chips or interfaces that may be arranged on electric tools for electric tool manufacturers to remotely read or write data during program setting and maintenance, or for users to perform basic tool operations such as starting, stopping, accelerating, and decelerating electric tools wirelessly. However, these technologies still have the following problems in common: when reading or writing data remotely, or performing basic operations of electric tools wirelessly, electric tool manufacturers or users can establish wireless connections and transmit data to tools equipped with wireless communication chips or interfaces only by strictly following the hardware configuration manuals of the tools, otherwise, intelligent terminals may be rendered unable to communicate with electric tools properly, wherein, in one aspect, this makes it inconvenient to maintain and use electric tools, and in another aspect, due to the limitations imposed by existing communication chips or interface settings, even after an electric tool is connected to an intelligent terminal, the data transmission speed is low, which makes it difficult to meet the requirements of some application scenarios that require sensitive speed adjustment of electric tools.

SUMMARY OF THE INVENTION

Overall, the exemplary embodiments disclosed herein provide an electrical appliance assembly for multiclient networking, and corresponding peripheral devices.

According to a first aspect, the present disclosure provides an electrical appliance assembly for multiclient networking, comprising an electrical appliance and a battery unit, the electrical appliance being configured to obtain electric energy from the battery unit or provide electric energy to the battery unit; the electrical appliance, as a first client, comprises a first communication interface and a second communication interface, wherein the first communication interface is configured to communicate with a peripheral device and the second communication interface is configured to communicate with a battery unit; the battery unit, as a second client, comprises a third communication interface and a fourth communication interface, wherein the third communication interface is configured to communicate with a peripheral device and the fourth communication interface is configured to communicate with an electrical appliance. With an electrical appliance assembly for multiclient networking disclosed herein, a plurality of clients are connectable to peripheral devices through communication interfaces arranged thereon, so that when wirelessly operating or controlling an electrical appliance assembly through peripheral devices, a user can flexibly establish wireless connections according to the conditions of the assembly or optionally, without the need to follow the hardware configuration manual of the electrical appliance assembly, which improves flexibility of use and the user experience.

In some embodiments, the electrical appliance is configured to, in a state where the electrical appliance is connected to a peripheral device through a first communication interface and a second communication interface is connected to a fourth communication interface, forward communication data between the peripheral device and the battery unit; the battery unit is configured to, in a state where the battery unit is connected to a peripheral device through a third communication interface and the second communication interface is connected to the fourth communication interface, forward communication data between the peripheral device and the electrical appliance.

In some embodiments, the electrical appliance is further configured to forward the communication data received from the first communication interface to the battery unit through the second communication interface according to a destination label in the communication data received from the first communication interface, and/or forward communication data received from the second communication interface to a peripheral device through the first communication interface according to a destination label in the communication data received from the second communication interface; the battery unit is further configured to forward communication data received from the third communication interface to an electrical appliance through the fourth communication interface according to a destination label in the communication data received from the third communication interface, and/or to forward communication data received from the fourth communication interface to a peripheral device through the third communication interface according to a destination label in the communication data received from the fourth communication interface.

In some embodiments, the electrical appliance assembly further comprises an expansion unit detachably installed on the electrical appliance; the expansion unit, as a third client, comprises a fifth communication interface, a sixth communication interface, and a seventh communication interface; the fifth communication interface is configured to communicate with a peripheral device, the sixth communication interface is configured to communicate with an electrical appliance, and the seventh communication interface is configured to communicate with a battery unit.

In some embodiments, the expansion unit is configured to, in a state where the expansion unit is connected to a peripheral device through a fifth communication interface and the sixth communication interface is connected to the second communication interface, forward communication data between the peripheral device and the electrical appliance; and/or, in a state where the expansion unit is connected to a peripheral device through the fifth communication interface and the seventh communication interface is connected to the fourth communication interface, forward communication data between the peripheral device and the battery unit; and/or, in a state where the sixth communication interface is connected to the second communication interface and the seventh communication interface is connected to the fourth communication interface, forward communication data between the electrical appliance and the battery unit.

In some embodiments, the first and third communication interfaces are wireless communication interfaces, and the second and fourth communication interfaces are wired communication interfaces.

In some embodiments, the first communication interface, the second communication interface, the third communication interface, and the fourth communication interface are full-duplex communication interfaces.

In some embodiments, the full-duplex communication interface is a UART port, SPI port, Bluetooth interface, or NB-IoT interface.

In some embodiments, the electrical appliance comprises a detachable electrical communication module, a first communication interface being arranged on the electrical communication module, and/or the battery unit comprises a detachable battery communication module, a third communication interface being arranged on the battery communication module.

In some embodiments, the expansion unit may be a sensor module, monitoring module, display module, storage module, or lighting module.

In some embodiments, the electrical appliance assembly is configured to, in response to a communication connection established between one client in the electrical appliance assembly and a peripheral device, break the communication connections between the other clients in the electrical appliance assembly and the other peripheral devices and/or turn off the function of the other clients in the electrical appliance assembly of communicating with peripheral devices. With an electrical appliance assembly for multiclient networking disclosed herein, by using preset evaluation rules in the system, any conflicts that may occur when more than one peripheral device simultaneously reads data from and/or writes data to an electrical appliance assembly are avoided, which allows the entire multiclient networking system to operate more flexibly, reliably, and efficiently.

In some embodiments, the electrical appliance is configured to, in response to a communication connection established with a peripheral device, broadcast, through a second communication interface, timestamp information about the communication connection established between the electrical appliance and the peripheral device; and the battery unit is configured to, in response to a communication connection established with a peripheral device, broadcast, through a fourth communication interface, timestamp information about the communication connection established between the battery unit and the peripheral device.

In some embodiments, the electrical appliance is configured to, in response to failing to receive any timestamp information sent by another client about a communication connection established between another client and the peripheral device within a predetermined time after broadcasting timestamp information about a communication connection established between the electrical appliance and the peripheral device, broadcast, through the second communication interface, a first message notifying the other clients in the electrical appliance assembly to turn off the function of communicating with a peripheral device; and the battery unit is configured to, in response to failing to receive any timestamp information sent by another client about a communication connection established between another client and the peripheral device within a predetermined time after broadcasting timestamp information about a communication connection established between the battery unit and the peripheral device, broadcast, through the fourth communication interface, a second message notifying the other clients in the electrical appliance assembly to turn off the function of communicating with a peripheral device.

In some embodiments, the electrical appliance is configured to, in response to received timestamp information sent by another client about a communication connection established between another client and a peripheral device within a predetermined time after broadcasting timestamp information about a communication connection established between the electrical appliance and a peripheral device, evaluate the timestamp information broadcast by the electrical appliance and the timestamp information sent by another client, and, in response to determining that the timestamp information broadcast by the electrical appliance is later than the timestamp information sent by another client, break the communication connection between the electrical appliance and the peripheral device, and turn off the function of the electrical appliance of communicating with a peripheral device; and the battery unit is configured to, in response to received timestamp information sent by another client about a communication connection established between another client and a peripheral device within a predetermined time after broadcasting timestamp information about a communication connection established between the battery unit and a peripheral device, evaluate the timestamp information broadcast by the battery unit and the timestamp information sent by another client, and, in response to determining that the timestamp information broadcast by the battery unit is later than the timestamp information sent by another client, break the communication connection between the battery unit and the peripheral device, and turn off the function of the battery unit of communicating with a peripheral device.

In some embodiments, the electrical appliance is configured to, in response to determining that the timestamp information broadcast by the electrical appliance is earlier than the timestamp information sent by another client, broadcast, through the second communication interface, a first message notifying the other clients in the electrical appliance assembly to break the communication connections to the peripheral device and turn off the function of communicating with a peripheral device; and the battery unit is configured to, in response to determining that the timestamp information broadcast by the battery unit is earlier than the timestamp information sent by another client, broadcast, through the fourth communication interface, a second message notifying the other clients in the electrical appliance assembly to break the communication connections to the peripheral device and turn off the function of communicating with a peripheral device.

In some embodiments, one client in the electrical appliance assembly is a master client configured to, in response to a communication connection established with a peripheral device and failure to receive any timestamp information sent by another client about a communication connection established between another client and a peripheral device within a predetermined time after establishing the communication connection, broadcast a third message to the other clients in the electrical appliance assembly, notifying same to turn off the function of communicating with a peripheral device; and the other clients in the electrical appliance assembly are slave clients configured to, in response to a communication connection established with a peripheral device, send timestamp information about a communication connection established between the slave clients and a peripheral device to the master client.

In some embodiments, the master client is further configured to, in response to received timestamp information sent by the slave clients about a communication connection established with a peripheral device within a predetermined time after establishing a communication connection to the peripheral device, evaluate the timestamp information about a communication connection established between the master client and a peripheral device and the timestamp information sent by the slave clients, thereby determining the client with the earliest timestamp information, and, in response to determining that the master client is the client with the earliest timestamp information, broadcast a fourth message to all the slave clients, notifying all the slave clients to break the communication connections to the peripheral devices and to turn off the function of communicating with a peripheral device.

In some embodiments, the master client is further configured to, in response to determining that the master client is not the client with the earliest timestamp information, break the communication connection between the master client and the peripheral device and turn off the function of the master client of communicating with a peripheral device.

In some embodiments, the master client is further configured to, in response to determining that the master client is not the client with the earliest timestamp information, send a fifth message to the slave clients other than the one with the earliest timestamp information, notifying said other slave clients to break the communication connections to the peripheral devices and turn off the function of communicating with a peripheral device.

In some embodiments, the electrical appliance assembly is further configured to, after any client in the electrical appliance assembly forwards communication data to the peripheral device, in response to the client that forwarded the communication data being disconnected from the peripheral device, turn on the function of each client of communicating with the peripheral device.

In some embodiments, the electrical appliance is an electric tool, and the battery unit is configured to provide working energy to the electric tool; alternatively, the electrical appliance is a charger configured to provide charging energy to the battery unit.

In some embodiments, the peripheral device is configured to receive a connection request from at least one client in the electrical appliance assembly, and establish a communication connection to one client in the electrical appliance assembly according to a user instruction.

In some embodiments, the peripheral device is configured to, in a state of having established a communication connection to one client in the electrical appliance assembly, send a communication instruction to said client to obtain data from any client in the electrical appliance assembly and/or send a control instruction to any client in the electrical appliance assembly.

In some embodiments, the peripheral device is an intelligent terminal, communication base station, or router.

It is readily comprehensible that this section is not intended to identify key or important features of embodiments of the present disclosure, nor is it intended to limit the scope of the present disclosure. Other features of the present disclosure will be made easily understandable by the following description.

BRIEF DESCRIPTION OF THE DRAWINGS

By giving a more detailed description of some embodiments of the present disclosure in conjunction with the drawings, the above and other advantages, features, and objectives of the present disclosure will become more apparent, and in the figures:

FIG. 2 is a schematic diagram of an exemplary message structure according to an embodiment of the present disclosure;

In all the drawings, identical or similar reference signs denote identical or similar elements.

SPECIFIC EMBODIMENTS

The principles of the present disclosure will be described below by referring to some exemplary embodiments. It is readily comprehensible that these embodiments are described for the sole purpose of explaining, and helping those of ordinary skill in the art to understand and implement the present disclosure rather than suggesting any limitations on the scope of the present disclosure. The content of the present disclosure described herein may be implemented in various manners other than the ones described below.

As used herein, the term "comprising" and variants thereof may be understood as open-ended terms, which means "including but not limited to". The term "based on" may be understood as "at least partially based on". The term "one embodiment" may be understood as "at least one embodiment". The term "another embodiment" may be understood as "at least one other embodiment". The term "mechanism" refers to modules such as circuit devices for implementing certain functions. In addition, in the present disclosure, the terms "information", "signal", and "data" may be used interchangeably for convenience of discussion. Other explicit and implicit definitions are included in the following text.

Figure 1:
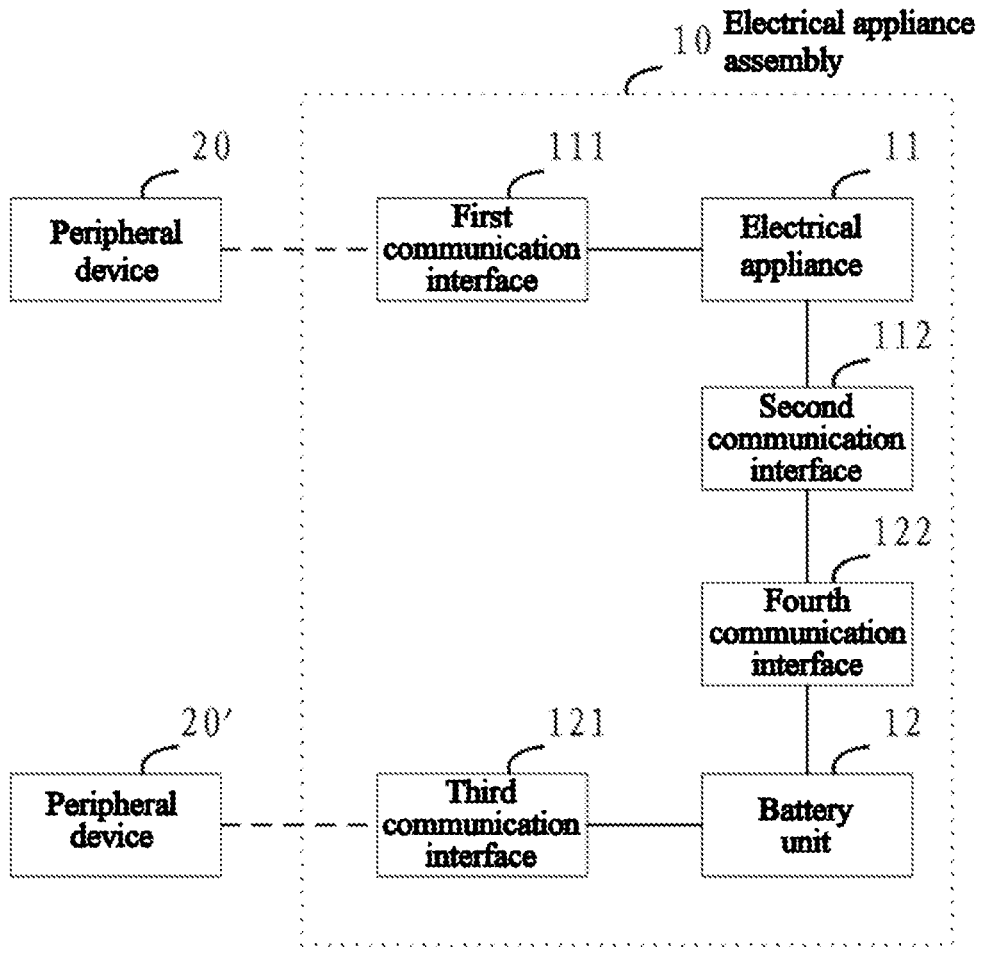
FIG. 1 is a schematic block diagram of an electrical appliance assembly for multiclient networking, in which some embodiments of the present disclosure are implementable.

FIG. 1 is a schematic block diagram of an electrical appliance assembly 10 for multiclient networking, in which some embodiments of the present disclosure are implementable. The electrical appliance assembly 10 for multiclient networking comprises an electrical appliance 11 and a battery unit 12. The electrical appliance 11, as a first client, is connectable to the battery unit 12 for operation. The electrical appliance 11 may be an electrical device, for example, a power tool, for obtaining electric energy from the battery unit 12, or it may be a charger for providing electric energy to the battery unit 12. The present disclosure is not intended to limit the type of the electrical appliance 11. If the electrical appliance 11 is a power tool, then the power tool can have a housing, a driving motor arranged in the housing, a switch for controlling the working status of the driving motor, and other components, in which case the battery unit provides working electric energy to the power tool. If the electrical appliance 11 is a charger, then the charger may have a housing, an electric energy conversion component arranged in the housing, a switch for controlling the start and stop of the electric energy conversion component, and other components, in which case the charger provides working electric energy to the battery unit 12 to charge the battery unit 12. As a second client, the battery unit 12, for example, may be any type of battery, such as a lithium-ion battery or nickel-hydrogen battery, wherein it may be a single battery or composed of a plurality of battery cells connected in series or parallel. This embodiment is described taking, for example, the electrical appliance 11 as being a power tool 11.

In addition to a power terminal for electric energy transmission, a signal terminal for communication data transmission is arranged between the power tool 11 and the battery unit 12. In this embodiment, the signal terminal will be described. The signal terminal comprises a first communication interface 111 and a second communication interface 112 that are arranged on the power tool 11, as well as a third communication interface 121 and a fourth communication interface 122 that are arranged on the battery unit 12. The fourth communication interface 122 is connected to the second communication interface 112 for the transmission of communication data between the power tool 11 and the battery unit 12, wherein the connection may be wired or wireless, and communication data may be transmitted directly between the power tool 11 and the battery unit 12 or transferred via another device, which is not limited in the present disclosure. In order to further ensure that communication data are transmitted in real time, in this embodiment, the power tool 11 and the battery unit 12 transmit communication data to each other directly and establish a wired connection therebetween.

The fourth communication interface 122 and the second communication interface 112 may be plug-in dedicated communication modules or integrated with a control portion inside the power tool 11 or the battery unit 12, which is not limited in the present disclosure. The second communication interface 112 and the fourth communication interface 122 are both provided as full-duplex communication interfaces, such as a UART port, SPI port, Bluetooth interface, or NB-IoT interface, to achieve the technical effects disclosed herein, which is not limited in the present disclosure. In one embodiment of the present disclosure, both the second communication interface 112 and the fourth communication interface 122 are provided as UART communication ports, and both the second communication interface 112 and the fourth communication interface 122 are provided with a receiving terminal (RX) and a transmitting terminal (TX), the RX of each communication interface being able to directly communicate with the TX of another communication interface, wherein, for example, the TX of the second communication interface 112 sends relevant data of the power tool 11 to the RX of the fourth communication interface 122, and, at the same time, the TX of the fourth communication interface 122 sends relevant data of the battery unit 12 to the RX of the second communication interface 112. By this arrangement method, the power tool 11 can receive information from the battery unit 12 while sending information to the battery unit 12, which, compared with the arrangement method in the prior art where a power tool and a battery unit cannot simultaneously send information, for example, the setting of an I2C port, significantly improves the efficiency of information transmission between the power tool 11 and the battery unit 12. In one aspect, the transmission efficiency of communication data reception by the power tool 11 from the battery unit 12 is improved, wherein the communication data may be relevant signals of the battery unit 12, such as identity information about the battery unit 12 and some detection data, such as voltage, current, and remaining power, of the battery unit 12, or may be control or request signals received by the battery unit 12 from the outside for the power tool 11. In another aspect, the transmission efficiency of communication data reception by the battery unit 12 from the power tool 11 is improved, wherein the communication data may be relevant signals of the power tool 11, such as identity information about the power tool 11, some detection data, such as speed, of the power tool 11, or may be control or request signals received by the power tool 11 from the outside for the battery unit 12.

In order to allow more convenient and flexible use of the electrical appliance assembly 10, so that a user can establish a connection and use it without being limited by the hardware configuration manual of the electrical appliance assembly 10, and, at the same time, the user can optionally connect the electrical appliance assembly 10, communication interfaces are arranged on the power tool 11 and the battery unit 12, respectively, in the present disclosure. Specifically, the power tool 11 is provided with a first communication interface 111, and the battery unit 12 is provided with a third communication interface 121, wherein the first communication interface 111 and the third communication interface 121 are both communication interfaces with a wireless connection module configured to communicate with the peripheral device 20 or 20'. The wireless connection module may be provided as a Bluetooth module, IoT module, NB-IoT module, WiFi module, LoRa module, ZigBee module, etc., so the wireless connection module may be provided as a detachable module for easy replacement according to different network environments, or as a communication module integrated with a control portion inside the power tool 11 or battery unit 12, which is not limited in the present disclosure. Therefore, when the first communication interface 111 or the third communication interface 121 is connected to and communicates with the peripheral device 20 or 20' through the corresponding wireless connection module, a user may not need to consider the location of the electrical appliance assembly 10 and information is transmitted to the electrical appliance assembly 10 through the peripheral device 20 or 20'. The peripheral device 20 or 20 can receive communication instructions such as connection requests, monitoring, maintenance, and faults from the electrical appliance assembly 10, and can also send communication instructions such as connection response, start-stop, acceleration and deceleration control to the electrical appliance assembly 10. In one embodiment, the wireless connection module of the first communication interface 111 or of the third communication interface 121 is provided as a full-duplex communication module, and the communication between the wireless connection module and the peripheral device 20 or 20' is also set to a full-duplex communication mode, so that the peripheral device 20 or 20' can simultaneously send and receive communication data when communicating with the electrical appliance assembly 10, thereby reducing latency and improving the user experience.

In one embodiment, similar to the second communication interface 112 and the fourth communication interface 122, the first communication interface 111 or the third communication interface 121 further comprises wired full-duplex communication terminals for wired communication with the power tool 11 or the battery unit 12. Thus, the first communication interface 111, besides being used for connecting to the peripheral device 20 or 20' through a wireless connection module, may also be used for connecting to the power tool 11 through wired full-duplex communication terminals; the third communication interface 121, besides being used for connecting to the peripheral device 20 or 20' through a wireless connection module, may also be used for connecting to the battery unit 12 through wired full-duplex communication terminals. Therefore, a solution provided by the present disclosure allows a significant reduction of latency during information exchange with the electrical appliance assembly 10 through the peripheral device 20 or 20', wherein, in one aspect, when the peripheral device 20 or 20' sends a control signal to the electrical appliance assembly 10, the response speed of the electrical appliance assembly 10 is improved; in another aspect, when the peripheral device 20 or 20' sends a request signal to the electrical appliance assembly 10, the feedback speed of the peripheral device 20 or 20' after receipt of feedback information from the electrical appliance assembly 10 is improved, further improving the user experience.

In one embodiment, in a state where the second communication interface 112 of the electrical appliance 11 in the electrical appliance assembly 10 is connected to the fourth communication interface 122 of the battery unit 12, the electrical appliance 11 is connectable to the peripheral device 20 or 20' through the first communication interface 111, and forwards communication data between the peripheral device 20 or 20' and the battery unit 12; in another aspect, the battery unit 12 may also be connected to the peripheral device 20 or 20' through a third communication interface 121, and forward communication data between the peripheral device 20 or 20' and the electrical appliance 11, so the peripheral device 20 or 20' actually forms a complete network system with the electrical appliances 11 and the battery unit 12 in the electrical appliance assembly 10. In this networking system, each type of device has a unique ID label, and each device also has a unique ID label, wherein when any device sends information to another device in the network system, it can add the ID label of the destination device to the message to be sent, and another device, according to this ID label, decides whether to receive and give a response to the message or forward it to another device, thus achieving data communication in the multiclient networking system. A message may have an http, xml, JSON, or BLE structure, or be generated by a custom method.

For example, the electrical appliance 11 can forward the communication data received from the first communication interface 111 to the battery unit 12 through the second communication interface 112 according to the ID label of the destination battery unit 12 in the communication data received from the first communication interface 111, and it can also, according to the ID label of the destination peripheral device 20 or 20' in the communication data received from the second communication interface 112, forward the communication data received from the second communication interface 112 to the peripheral device 20 or 20' through the first communication interface 111. Similarly, the battery unit 12 can also forward the communication data received from the third communication interface 121 to the destination electrical appliance 11 through the fourth communication interface 122 according to the ID label of the destination electrical appliance 11 in the communication data received from the third communication interface 121, and it can also, according to the ID label of the destination peripheral device 20 or 20' in the communication data received from the fourth communication interface 122, forward the communication data received from the fourth communication interface 122 to the peripheral device 20 or 20' through the third communication interface 121.

In a further embodiment, when any device sends a message to another device in a network system, it can simultaneously add the ID label of the destination device and the ID label of the source device to the message to be sent, and another device can, according to the ID label of the destination device, determine whether to receive and give a response to the information or forward it to another device, while identifying the source device of the labeled information, so that each device in the network system may be better monitored and controlled, thereby achieving more effective data communication in the multiclient networking system. With an electrical appliance assembly for multiclient networking disclosed herein, a plurality of clients are connectable to peripheral devices through communication interfaces arranged thereon, so that when wirelessly operating or controlling an electrical appliance assembly through peripheral devices, a user can flexibly establish wireless connections according to the conditions of the assembly or optionally, without the need to follow the hardware configuration manual of the electrical appliance assembly, which improves flexibility of use and the user experience.

The above embodiments are all based on a working mode where the peripheral device 20 or 20' is connected to the electrical appliance assembly 10 to form a network, which means that the electrical appliance assembly 10 is connected to and communicates with only one peripheral device. When two or more peripheral devices, for example, the peripheral devices 20 and 20', are connected to the electrical appliance assembly 10, a conflict will occur where two or more peripheral devices simultaneously read data from and/or write data to the electrical appliance assembly 10. On the basis of each device in the network being able to communicate with other devices as described above, a solution disclosed herein also solves the problem of a conflict arising from data reading and writing: the electrical appliance assembly 10 may be configured to, in response to a communication connection established between any client in the electrical appliance 11 and the battery unit 12 and one peripheral device, for example, the peripheral device 20, break or close the communication connection established between the other client in the electrical appliance 11 and the battery unit 12 and another peripheral device, for example, the peripheral device 20'. When establishing a communication connection to a peripheral device, the electrical appliance 11 may broadcast its connection message in the network system, notifying other clients, such as the battery unit 12, so that the battery unit 12 is disconnected and no longer connects to any other peripheral device, or stops sending any requests for connecting to other peripheral devices; when establishing a communication connection to a peripheral device, the battery unit 12 may broadcast its connection message in the network system, notifying other clients, such as the electrical appliance 11, so that the electrical appliance 11 is disconnected and no longer connects to any other peripheral device, or stops sending any requests for connecting to other peripheral devices.

Figure 2:
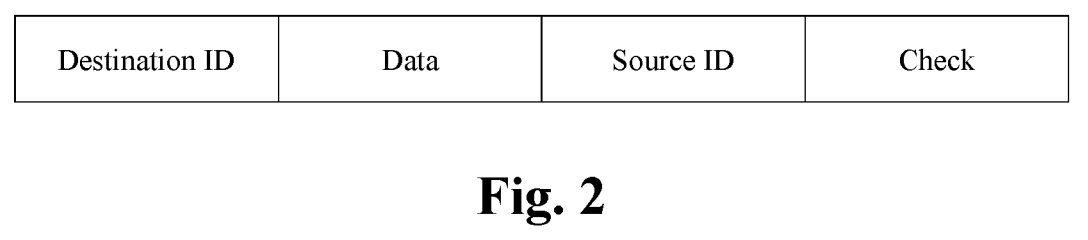
Figure 7:
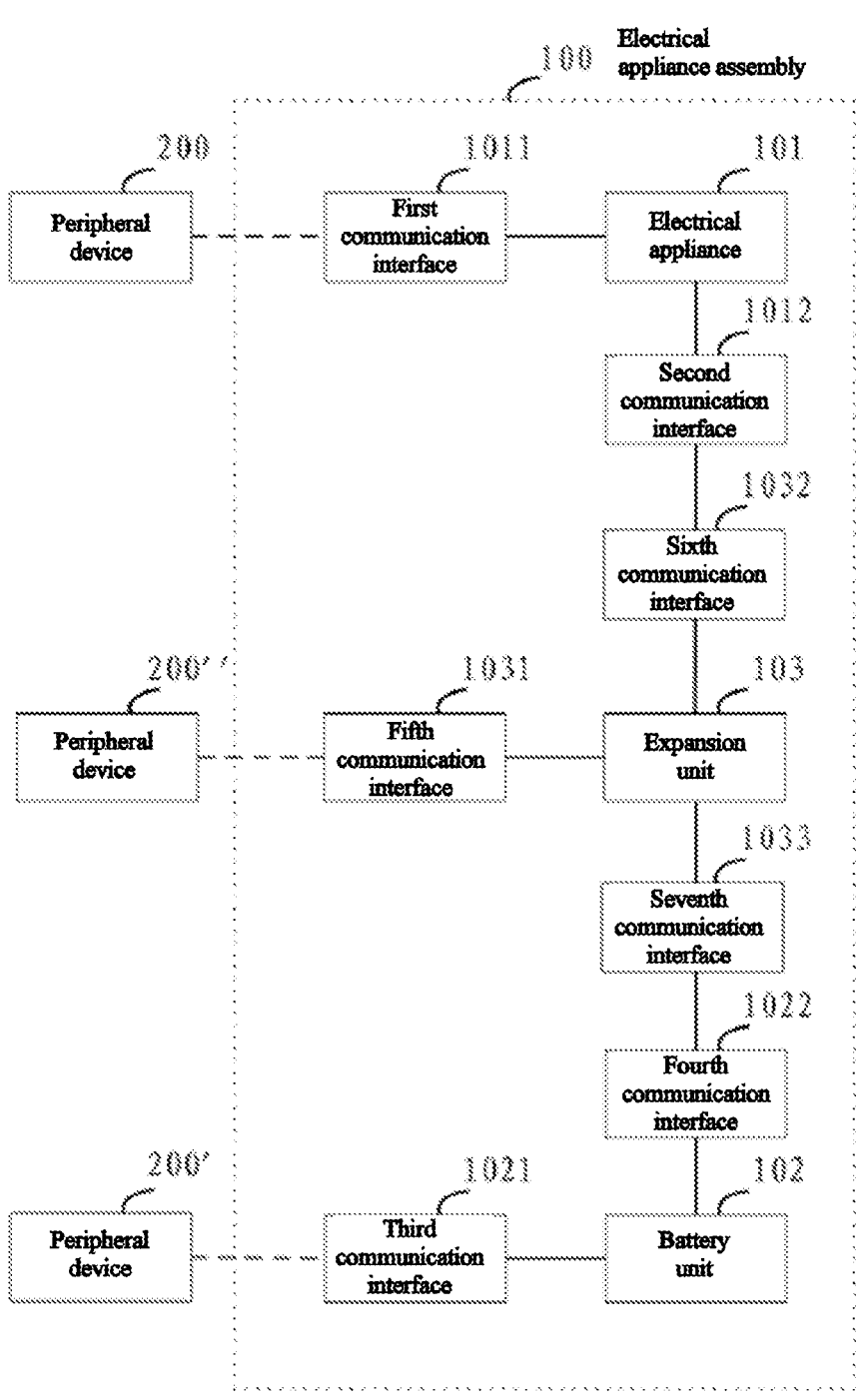
FIG. 7 is a schematic block diagram of an electrical appliance assembly for multiclient networking that comprises an expansion unit.
Figure 8:
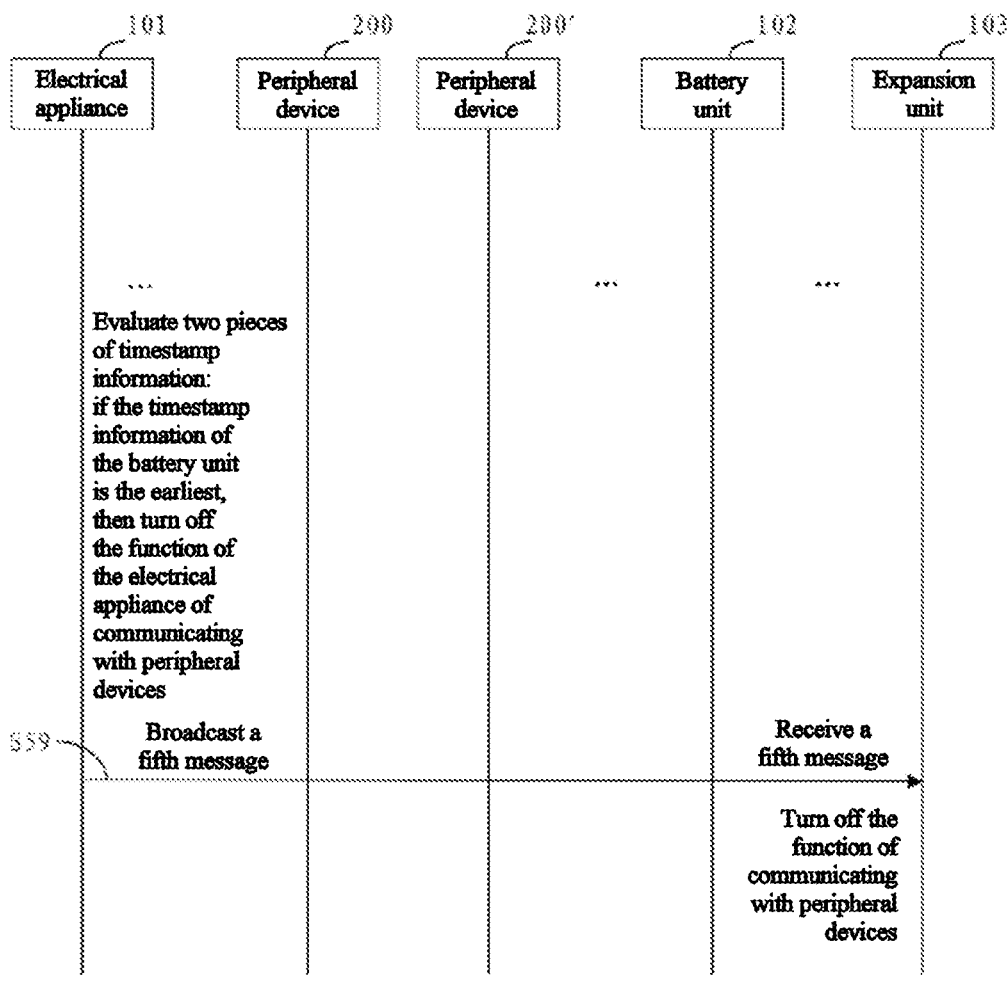
FIG. 8 is a schematic diagram of the networking process of an electrical appliance assembly for multiclient networking according to the embodiment shown in FIG. 7.

In one embodiment, the peripheral device 20 is used as an example to form a network system with the electrical appliance assembly 10, and the power tool 11 is taken as an example of the electrical appliance 11, wherein when the power tool 11 is connected to the fourth communication interface 122 of the battery unit 12 through the second communication interface 112, the power tool 11 is connectable to the peripheral device 20 via Bluetooth through the first communication interface 111, or the battery unit 12 is connectable to the peripheral device 20 via Bluetooth through the third communication interface 121. The communication terminals between the first communication interface 111 and the electrical appliance 11, the second communication interface 112, the communication terminals between the third communication interface 121 and the battery unit 12, and the fourth communication interface 122 are all set to UART mode. In this embodiment, the ID label of the peripheral device 20 is named Mobile1, and the ID label of the peripheral device 20' is named Mobile2, wherein peripheral devices of the same type can have a common ID label, namely Mobile; the ID label of the power tool 11 is named Tool1, and the ID label of the battery unit 12 is named Pack1. For the sake of convenience, the ID labels of the first communication interface 111, second communication interface 112, third communication interface 121, and fourth communication interface 122 are set to UART1, UART2, UART3, and UART4, respectively. When the peripheral devices 20 and 20' transmit messages to the electrical appliance assembly 10, the messages adopt a custom structure, wherein the message structure shown in FIG. 2 is exemplary, and the present disclosure is not limited thereto. The message structure shown in FIG. 2 comprises a destination ID, a source ID, and the data content to be transmitted. Byte positions may be flexibly set in a predefined manner, wherein, in this embodiment, exemplarily, the first few bytes of the message structure are set as the destination ID, the last few bytes are set as the source ID, and the intermediate bytes carry the information to be transmitted. Optionally, a check bit may further be added at the end or beginning of a message to further improve the reliability of data transmission. The following embodiments will be described using different working scenarios of the network system as examples:

FIGS. 3-6 and 8 show the process of networking the peripheral device 20 or 20' and the electrical appliance assembly 10, 200, 200' or 200" and the electrical appliance assembly 100 together in multiclient networking under different scenarios. FIGS. 3-6 are described on the basis of the networking system shown in FIG. 1, and FIG. 8 is described on the basis of the networking system shown in FIG. 7.

When the network system has not yet entered a proper operating state, as in steps S11 and S12, or S21 and S22, or S31 and S32, or S41 and S41, each client broadcasts connection requests to peripheral devices through a communication interface arranged thereon. The first communication interface 111 and the third communication interface 121 broadcast connection request messages Mobile_ConnectRq to the peripheral device 20 or 20' through Bluetooth interfaces, indicating that the power tool 11 connected to the first communication interface 111 and the battery unit 12 connected to the third communication interface 121 are both in a connectable state. The first communication interface 111 broadcasts a connection request message Mobile_ConnectRq_UART1, and the third communication interface 121 broadcasts a connection request message Mobile_ConnectRq_UART3. The peripheral device 20 or 20' can both receive the request message, in which case both the user of the peripheral device 20 and the user of the peripheral device 20' may perform an action responding to the connection request. This will be described below under different scenarios.

Figure 3:
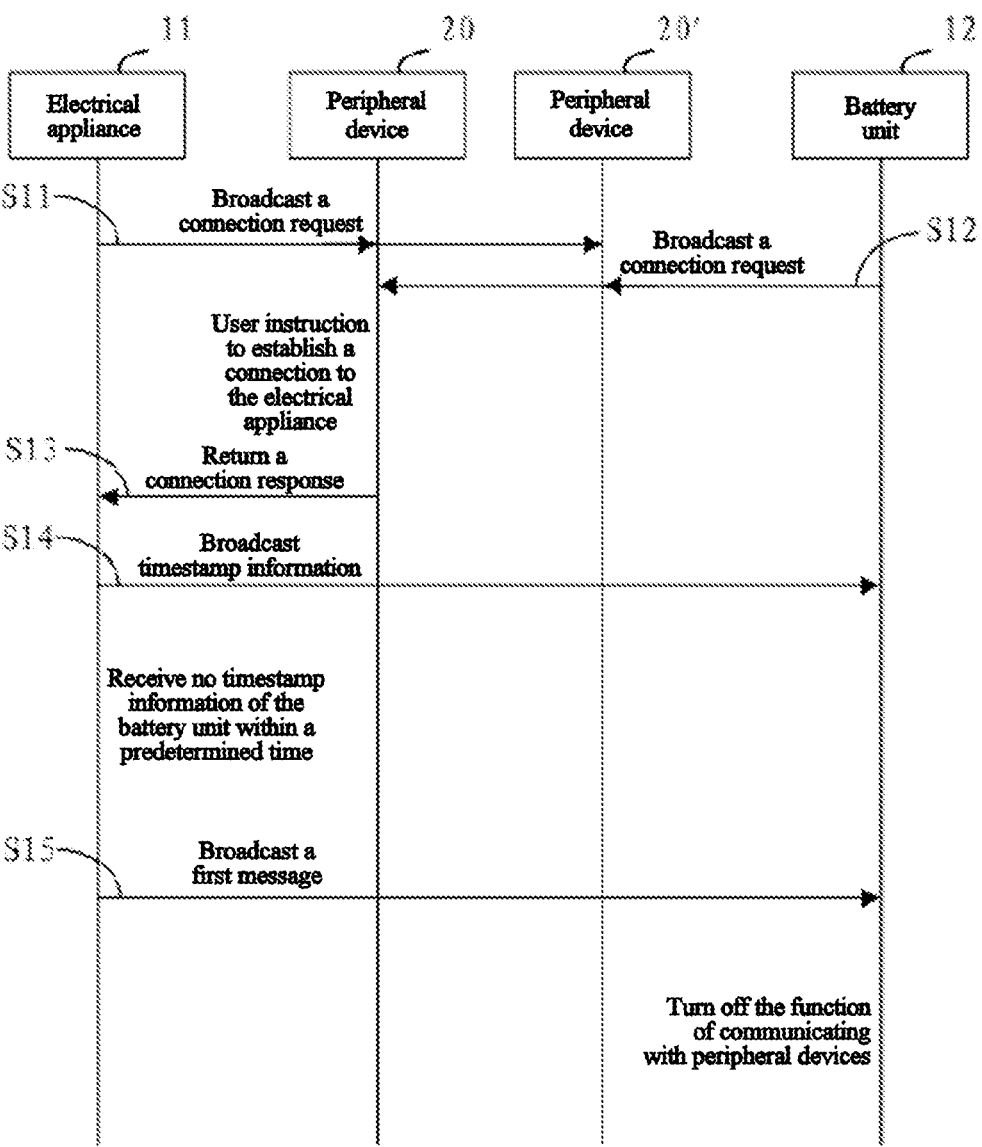
FIG. 3 is a schematic diagram of a networking method of an electrical appliance assembly for multiclient networking according to an embodiment of the present disclosure.

First scenario: As shown in FIG. 3, the peripheral device 20 or 20' receives connection request messages Mobile_ConnectRq_UART1 and Mobile_ConnectRq_UART3, at which point the peripheral device 20 receives a user instruction giving a response to Mobile_ConnectRq_UART1, at which point the peripheral device 20 is connected to the first communication interface 111 and returns a connection message UART1_ConnectRe_Time1_Mobile1 to the first communication interface 111, wherein this message can contain the time when the peripheral device 20 establishes a connection to the first communication interface 111, for example, Time 1, as in step S13. Alternatively, the peripheral device 20 can directly return timestamp information about a connection established between the peripheral device 20 and the first communication interface 111, for example, UART1_Time1_Mobile1, as long as it allows the first communication interface 111 to obtain the timestamp for a connection established between the peripheral device 20 and the first communication interface 111, both of which belong to the inventive concept of the present disclosure. After receiving the message, the first communication interface 111, in response to the message, broadcasts timestamp information UART_Time1_UART1 to the other communication interfaces in the network through the power tool 11 and the second communication interface 112, as in step S14. Assuming that the peripheral device 20' never gives a response and the peripheral device 20 gives no response to Mobile_ConnectRq_UART3 either, the first communication interface 111 has received no timestamp information sent by another communication interface. Assuming that within a predetermined time, the first communication interface 111 has received no timestamp information sent by another communication interface, the first communication interface 111 broadcasts a first message to the other communication interfaces in the network through the second communication interface 112, as shown in step S15. The first message, for example, is a close message UART_Close_UART1 that notifies the battery unit 12 to turn off the function of communicating with peripheral devices. Upon receiving the message, the other clients, such as the communication interface of the battery unit 12, stop sending connection requests to peripheral devices. The predetermined time may be set according to user needs, wherein, for example, it may be set to 5 s or 10 s, which is not limited in the present disclosure.

At this point, the peripheral device 20 establishes a connection to and maintains data communication with the first communication interface 111, wherein the power tool 11, besides receiving and sending data related thereto from/to the peripheral device 20, forwards data related to the battery unit 12 between the peripheral device 20 and the battery unit 12. Thus, the peripheral device 20, besides being capable of obtaining data from any client in the electrical appliance assembly 10, can send a control instruction to any client in the electrical appliance assembly 10. By the same logic, the peripheral device 20 establishes a connection to and maintains data communication with the third communication interface 121, or the peripheral device 20' establishes a connection to and maintains data communication with the first communication interface 111, or the peripheral device 20' establishes a connection to and maintains data communication with the third communication interface 121, all of which are similar to this scenario and will not be described in detail again herein.

Figure 4:
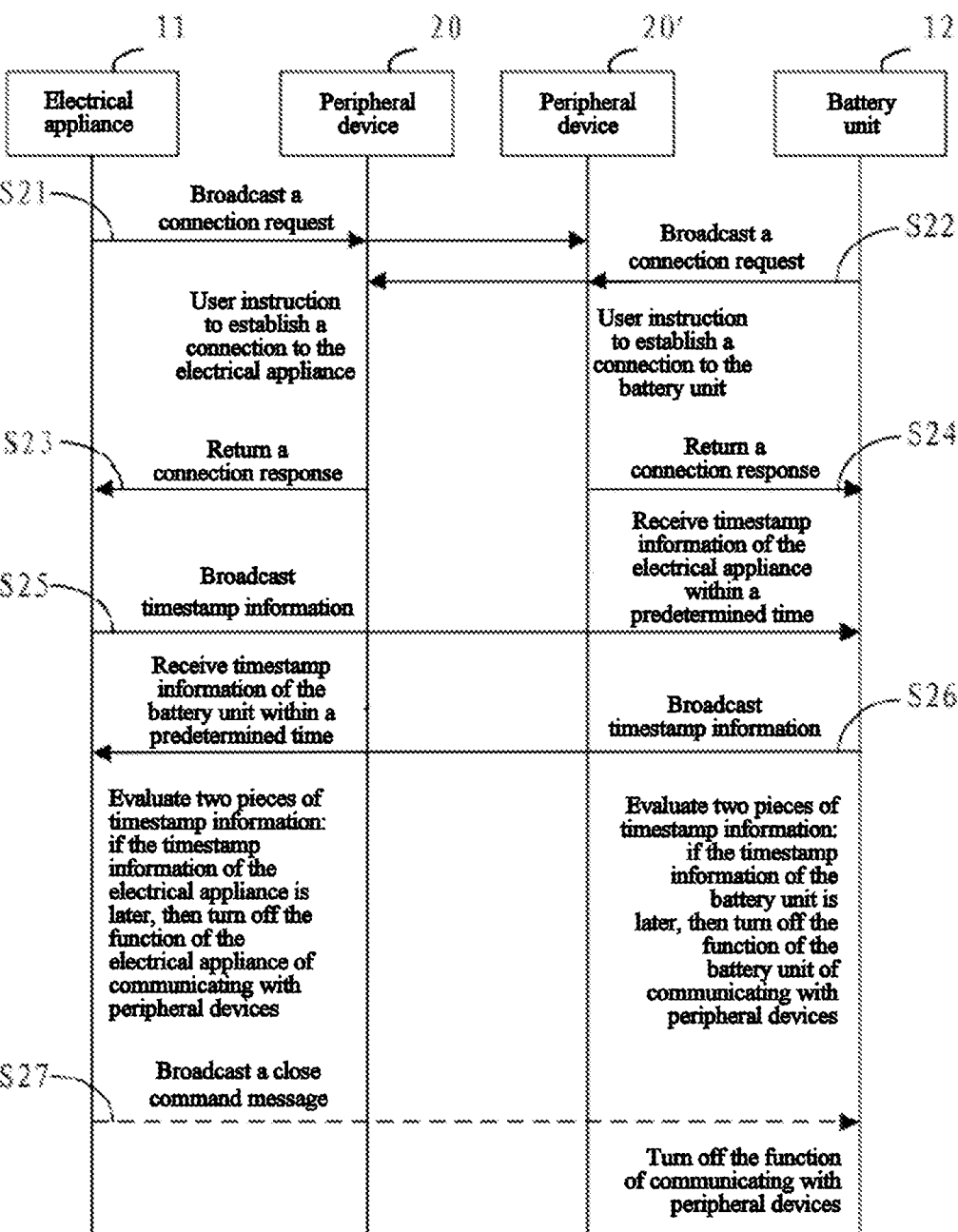
FIG. 4 is a schematic diagram of a networking method of an electrical appliance assembly for multiclient networking according to an embodiment of the present disclosure.

Second scenario: As shown in FIG. 4, the peripheral device 20 or 20' receives connection request messages Mobile_ConnectRq_UART1 and Mobile_ConnectRq_UART3, at which point the peripheral device 20 receives a user instruction giving a response to Mobile_ConnectRq_UART1, at which point the peripheral device 20 is connected to the first communication interface 111 and returns a connection response UART1_ConnectRe_Time1_Mobile1 to the first communication interface 111, wherein this message can contain the time when the peripheral device 20 establishes a connection to the first communication interface 111, for example, Time1, as in step S23. Upon receiving the message, the first communication interface 111, in response to the message, broadcasts timestamp information UART_Time1_UART1 to the other communication interfaces in the network through the power tool 11 and the second communication interface 112, as in step S25.

Within a predetermined time, the peripheral device 20' also receives a user instruction giving a response to Mobile_ConnectRq_UART3, at which point the peripheral device 20' is connected to the third communication interface 121 and returns a connection response UART3_ConnectRe_Time2_Mobile2 to the third communication interface 121, wherein this information can contain the time when the peripheral device 20' establishes a connection to the third communication interface 121, such as Time2, as in step S24. Upon receiving the message, the third communication interface 121, in response to the message, broadcasts timestamp information UART_Time2_UART3 to the other communication interfaces in the network through the battery unit 12 and the fourth communication interface 122, as in step S26.

Therefore, the first communication interface 111 will receive the message UART1_ConnectRe_Time1_Mobile1 returned by the peripheral device 20 and the message UART_Time2_UART3 broadcast by the third communication interface 121, and the third communication interface 121 will receive the message UART3_ConnectRe_Time2_Mobile2 returned by the peripheral device 20' and the message UART_Time1_UART1 broadcast by the first communication interface 111.

At this point, the first communication interface 111 evaluates the two received timestamps Time1 and Time2 according to preset rules, while the third communication interface 121 can also evaluate the two received timestamps Time1 and Time2 according to preset rules to obtain evaluation results. According to the evaluation results, the first communication interface 111 and the third communication interface 121 establish a connection to the peripheral device 20 or 20'. Preset evaluation rules may adopt various modes. In one embodiment, the first communication interface 111 and the third communication interface 121 compare the time points of two timestamps Time1 and Time2, and after comparison, obtain the earliest timestamp information, which is used as the evaluation result, wherein, indeed, the latest timestamp information may also be used as the evaluation result. Both belong to the inventive concept of the present disclosure. In another embodiment, the first communication interface 111 and the third communication interface 121 compare the corresponding peripheral device priorities for two timestamps Time1 and Time2, wherein, for example, different priorities may be set for different peripheral devices, or durations of establishing connections to different clients may be set according to different peripheral devices. This embodiment is described using the example that a comparison is made between the time points of Time1 and Time2, and the earliest timestamp information obtained is used as the evaluation result.

After the evaluation by the first communication interface 111, if the evaluation result shows that the time point of Time1 is earlier than the time point of Time2, then the connection between the first communication interface 111 and the peripheral device 20 will be maintained. At the same time, the first communication interface 111 broadcasts a first message to the other communication interfaces in the network through the power tool 11 and the second communication interface 112, wherein the first message may be a disconnect and close command message, which includes broadcasting a disconnection command message UART_Close_UART1 to the third communication interface 121 that is already connected to the peripheral device 20', and if there are other communication interfaces in the system that have not yet been connected to peripheral devices, broadcasting a close message, for example, UART_Close_UART1, to the other communication interfaces not connected to peripheral devices in the system. Other communication interfaces that have already been connected to the peripheral device 20', such as the third communication interface 121, obtain the same evaluation results according to the same evaluation rules, which means that the time point of Time1 is earlier than the time point of Time2, so the third communication interface 121 can break the communication connection between the battery unit 12 and the peripheral device 20', and turn off the communication function between the battery unit 12 and the peripheral device 20'. Alternatively, the battery unit 12 may also, in response to the received disconnect and close command message UART3_Close_UART1, be disconnected from the peripheral device 20', as shown in step S27, which may be flexibly set according to needs and is not restricted in this solution. At the same time, all the communication interfaces except the first communication interface 111, upon receiving the disconnect and close command message UART_Close_UART1, stop sending connection requests to peripheral devices. The predetermined time may be set according to user needs, wherein, for example, it may be set to 5 s or 10 s, which is not limited in the present disclosure.

In this scenario, although the peripheral devices 20 and 20' are connected to the electrical appliance assembly 10, by using the preset evaluation rules of the system that have a conflict prevention mechanism, any conflicts that may occur when more than one peripheral device simultaneously reads data from and/or writes data to the electrical appliance assembly 10 are prevented, so the peripheral device 20 establishes a connection to and performs data communication with the first communication interface 111, while the power tool 11, besides receiving and sending data related thereto from/to the peripheral device 20, forwards data related to the battery unit 12 between the peripheral device 20 and the battery unit 12.

Similar to the above embodiment, when the time point of Time1 is later than the time point of Time2, the first communication interface 111 breaks the communication connection between the power tool 11 and the peripheral device 20, and turns off the communication function between the power tool 11 and the peripheral device 20. Alternatively, the power tool 11 may also break and close the connection between the power tool 11 and the peripheral device 20 in response to a received second message. At this point, the second message may be, for example, a disconnect and close command message UART1_Close_UART3, and the power tool 11, in response to receiving this message, breaks and closes the connection to the peripheral device 20, which may be flexibly set according to needs. Thus, the peripheral device 20' establishes a connection to and performs data communication with the third communication interface 121. Thus, the peripheral device 20', besides being capable of obtaining data from any client in the electrical appliance assembly 10, may send a control instruction to any client in the electrical appliance assembly 10. By the same logic, the peripheral device 20 establishes a connection to and performs data communication with the third communication interface 121, or the peripheral device 20' establishes a connection to and performs data communication with the first communication interface 111, both of which are similar to this scenario and will not be described in detail again herein. With an electrical appliance assembly for multiclient networking disclosed herein, by using preset evaluation rules in the system, any conflicts that may occur when more than one peripheral device simultaneously reads data from and/or writes data to an electrical appliance assembly are avoided, which allows the entire multiclient networking system to operate more flexibly, reliably, and efficiently.

Considering that each communication interface in the above two scenarios has the same hardware and/or software settings, as a variant embodiment of the present disclosure, the hardware and/or software settings of each communication interface may also be set differently. In the following embodiment, one client in the electrical appliance assembly 10 is the master client, whose corresponding communication interface is set to, in response to receiving a message containing timestamp information sent from another client, perform evaluation and, according to the evaluation results, decide whether to send a disconnect and close command message to the other clients. The other clients are slave clients, whose corresponding communication interface is set to, in response to a communication connection established with a peripheral device, send a message containing timestamp information about the communication connection established between the slave client and the peripheral device to the master client. The following embodiment will take the power tool 11 in the network being the master client and the other clients being slave clients as an example, which will still be explained in different scenarios.

Figure 5:
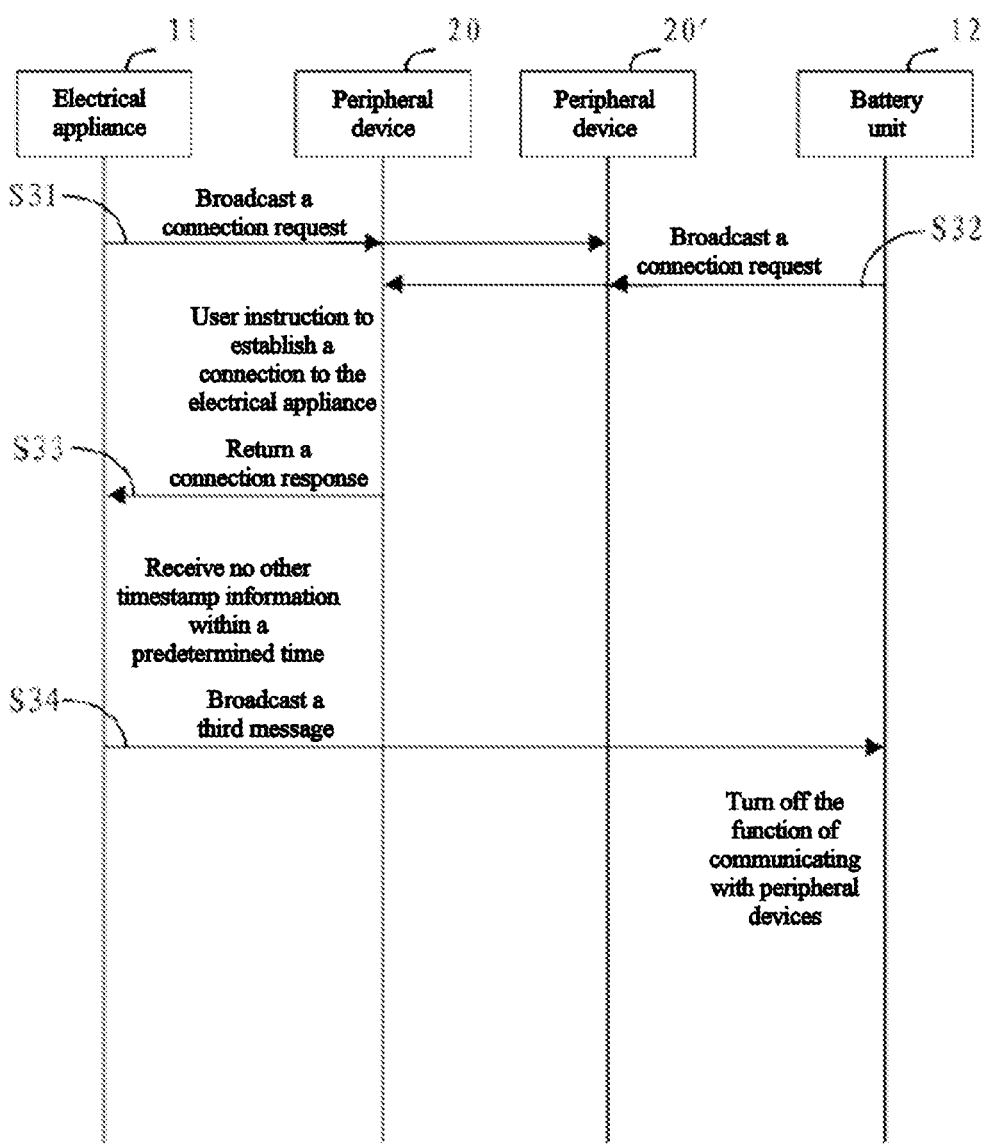
FIG. 5 is a schematic diagram of a networking method of an electrical appliance assembly for multiclient networking according to an embodiment of the present disclosure.

Third scenario: Similar to the first scenario, as shown in FIG. 5, the peripheral device 20 or 20' receives a connection request message Mobile_ConnectRq_UART1 from the master client and a connection request message Mobile_ConnectRq_UART3 from a slave client, at which point, as shown in step S33, the first communication interface 111 gives a response to the connection to the peripheral device 20 and receives connection information UART1_ConnectRe_Time1_Mobile1 returned by the peripheral device 20 to the first communication interface 111. Assuming that the peripheral device 20' never gives a response and the peripheral device 20 gives no response to Mobile_ConnectRq_UART3 either, the first communication interface 111 has received no timestamp information sent by another communication interface. Assuming that within a predetermined time, the first communication interface 111 has received no timestamp information sent by another communication interface, the first communication interface 111 broadcasts a third message to the other communication interfaces in the network through the second communication interface 112, as shown in step S34. The third message, for example, is a close message UART3_Close_UART1 that notifies the battery unit 12 to turn off the function of communicating with peripheral devices. If there are other clients in the network, their communication interfaces will stop sending connection requests to peripheral devices upon receiving the message. The predetermined time may be set according to user needs, wherein, for example, it may be set to 5 s or 10 s, which is not limited in the present disclosure.

At this point, the peripheral device 20 establishes a connection to and maintains data communication with the first communication interface 111, wherein the power tool 11, besides receiving and sending data related thereto from/to the peripheral device 20, forwards data related to the battery unit 12 between the peripheral device 20 and the battery unit 12. Thus, the peripheral device 20, besides being capable of obtaining data from any client in the electrical appliance assembly 10, can send a control instruction to any client in the electrical appliance assembly 10. By the same logic, the peripheral device 20 establishes a connection to and maintains data communication with the third communication interface 121, or the peripheral device 20' establishes a connection to and maintains data communication with the first communication interface 111, or the peripheral device 20' establishes a connection to and maintains data communication with the third communication interface 121, all of which are similar to this scenario and will not be described in detail again herein.

Figure 6:
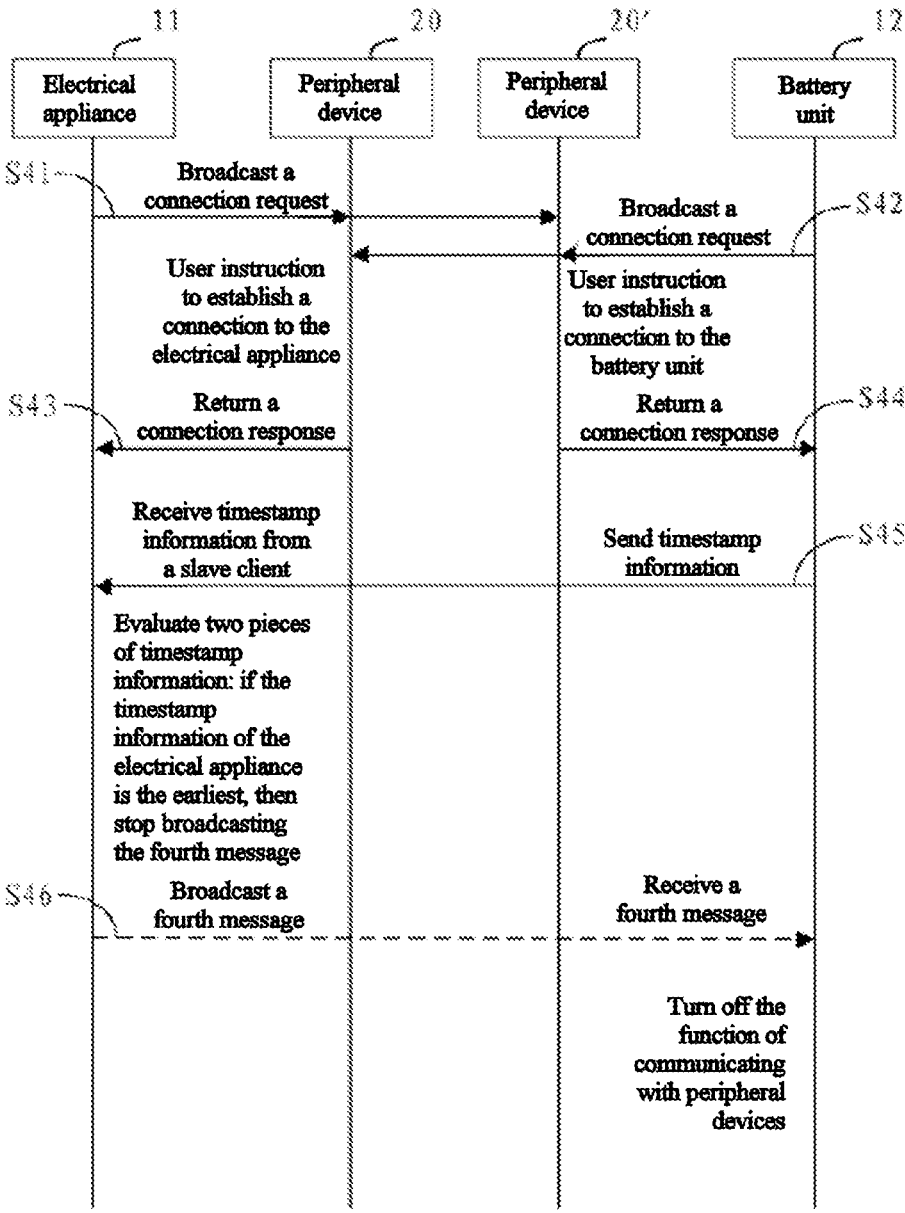
FIG. 6 is a schematic diagram of a networking method of an electrical appliance assembly for multiclient networking according to an embodiment of the present disclosure.

Fourth scenario: Similar to the second scenario, as shown in FIG. 6, the peripheral device 20 or 20' receives connection request messages Mobile_ConnectRq_UART1 from the master client and a connection request message Mobile_ConnectRq_UART3 from a slave client, at which point the peripheral device 20 receives a user instruction giving a response to Mobile_ConnectRq_UART1, at which point the peripheral device 20 is connected to the first communication interface 111 of the master client and returns a connection response UART1_ConnectRe_Time1_Mobile1 to the first communication interface 111, wherein this message contains the time when the peripheral device 20 establishes a connection to the first communication interface 111 of the master client, for example, Time1, as in step S43.

Within a predetermined time, the peripheral device 20' also receives a user instruction giving a response to Mobile_ConnectRq_UART3, at which point the peripheral device 20' is connected to the third communication interface 121 of the slave client and returns a connection response UART3_ConnectRe_Time2_Mobile2 to the third communication interface 121, wherein this information contains the time when the peripheral device 20' establishes a connection to the third communication interface 121, such as Time2, as in step S44. Upon receiving the message, the third communication interface 121 of the slave client, in response to the message, broadcasts timestamp information UART1_Time2_UART3 to the communication interface of the master client in the network through the battery unit 12 and the fourth communication interface 122, as in step S45.

Therefore, the first communication interface 111 of the master client will receive a message UART1_ConnectRe_Time1_Mobile1 returned by the peripheral device 20 and a message UART1_Time2_UART3 sent from the third communication interface 121 of the slave client. At this point, the first communication interface 111 evaluates the two received timestamps Time1 and Time2 according to preset rules. In one embodiment, the first communication interface 111 of the master client compares the time points of two timestamps Time1 and Time2, and obtains the earliest timestamp information, which is used as the evaluation result, wherein, indeed, the latest timestamp information may also be used as the evaluation result. Both belong to the inventive concept of the present disclosure. This embodiment is described using the example that a comparison is made between the time points of Time1 and Time2, and the earliest timestamp information obtained is used as the evaluation result.

If, after the evaluation by the first communication interface 111 of the master client, the evaluation result shows that the time point of Time1 is the earliest time point, then the connection between the first communication interface 111 and the peripheral device 20 will be maintained. Meanwhile, the first communication interface 111 broadcasts a fourth message to all the slave clients in the network through the power tool 11 and the second communication interface 112, as shown in step S46. The fourth message notifies all the slave clients to break their communication connections to peripheral devices and to turn off the function of communicating with the peripheral device 20 or 20'. The fourth message comprises broadcasting a close command message UART3_Close_UART1 to the third communication interface 121 that is already connected to the peripheral device 20', and if there are other communication interfaces in the system that have not yet been connected to peripheral devices, broadcasting a close message, for example, UART-_Close_UART1, to the other communication interfaces not connected to peripheral devices in the system. Other communication interfaces that have already been connected to the peripheral device 20', such as the third communication interface 121, in response to the received close command message UART3_Close_UART1, are disconnected from the peripheral device 20'. Meanwhile, all the other communication interfaces, upon receiving a close command message UART_Close_UART1, stop sending connection requests to peripheral devices. The predetermined time may be set according to user needs, wherein, for example, it may be set to 5 s or 10 s, which is not limited in the present disclosure.

If, after the evaluation by the first communication interface 111 of the master client, the evaluation result shows that the time point of Time2 is the earliest time point, then the first communication interface 111 is disconnected from the peripheral device 20 and turns off the communication function between the first communication interface 111 and a peripheral device.

While the above embodiment comprises an electrical appliance assembly with two clients, clients are expandable in the present disclosure. As shown in FIG. 7, the electrical appliance assembly 100 further comprises a multiclient networking system with an expansion unit 103. In one embodiment, in addition to a system composition similar to the above embodiment, the electrical appliance assembly 100 for multiclient networking further comprises an expansion unit 103 that may be detachably installed on the electrical appliance 101 or integrated with the electrical appliance 101. The expansion unit 103 is exemplarily provided as a sensor module, monitoring module, display module, storage module, lighting module, etc., and the number of expansion units 103 is not limited in the present disclosure, so expansion units may be flexibly selected and set according to user needs. This embodiment is described taking one expansion unit 103 as an example.

In this system, the electrical appliance 101 serves as the first client, the battery unit 102 serves as the second client, and the expansion unit 103 serves as the third client. The expansion unit 103 comprises a fifth communication interface 1031 for communicating with the peripheral device 200, 200', or 200", a sixth communication interface 1032 for communicating with the electrical appliance 101, and a seventh communication interface 1033 for communicating with the battery unit 102. Similar to the aforementioned embodiment, the fifth communication interface 1031 is a communication interface with a wireless connection module for communicating with the peripheral device 200, 200', or 200". The fifth communication interface 1031, sixth communication interface 1032, and seventh communication interface 1033 are all full-duplex communication modules, so that the peripheral device 200, 200', or 200" can simultaneously send and receive communication data when communicating with the electrical appliance assembly 100, thereby reducing latency and improving the user experience.

In this network, any device can communicate with other devices. In the state where the expansion unit 103 is connected to the peripheral device 200, 200' or 200" through the fifth communication interface 1031 and the sixth communication interface 1032 is connected to the second communication interface 1012, the expansion unit 103, besides receiving and sending data related thereto from/to the peripheral device 200, 200' or 200", forwards communication data between the peripheral device 200, 200' or 200" and the electrical appliance 101. In the state where the expansion unit 103 is connected to the peripheral device 200, 200' or 200" through the fifth communication interface 1031 and the seventh communication interface 1033 is connected to the fourth communication interface 1022, the expansion unit 103 may also forward communication data between the peripheral device 200, 200' or 200" and the battery unit 102. When the expansion unit 103 is not connected to the peripheral device 200, 200' or 200", the other clients in the system are connected to the peripheral device 200, 200' or 200", the sixth communication interface 1032 is connected to the second communication interface 1012, and the seventh communication interface 1033 is connected to the fourth communication interface 1022, the expansion unit 103 can also forward communication data between the electrical appliance 101 and the battery unit 102.

On the basis of the conflict prevention mechanism of the aforementioned embodiment, in this embodiment, the fifth communication interface 1031 of the expansion unit 103, in response to a message containing timestamp information received from the peripheral device 200, 200' or 200", broadcasts the message to the other communication interfaces in the system, so that the other communication interfaces can evaluate the multiple pieces of timestamp information received; alternatively, the fifth communication interface 1031 of the expansion unit 103, in response to a message containing timestamp information received from the peripheral device 200, 200' or 200", forwards the message to the first communication interface 1011 of the master client 101 and the first communication interface 1011 performs evaluation according to a preset rule, thereby determining, according to the evaluation result, the client whose connection to the peripheral device 200, 200' or 200" should be retained and the clients whose communication connections to peripheral devices should be broken, so that any conflicts arising from data reading/writing are prevented.

As shown in FIG. 8, similar to the fourth scenario, if the evaluation by the first communication interface 1011 of the master client is completed and the evaluation result shows that the timestamp information about a communication connection established between one slave client, namely the battery unit 102, and a peripheral device is the earliest or latest, which means that the communication connection established between the battery unit 102 and the peripheral device should be maintained, then the first communication interface 1011 of the master client breaks its connection to the peripheral device, and turns off its function of communicating with peripheral devices. Unlike the fourth scenario, the first communication interface 1011 of the master client further sends a fifth message to the slave clients in the network, except the client with the earliest timestamp information, namely the battery unit 102, as in step S59. The fifth message notifies the slave client other than the battery unit 102, namely the fifth communication interface 1031 of the expansion unit 103, to break the communication connection to a peripheral device and turn off the function of communicating with peripheral devices.

At this point, a peripheral device establishes a connection to and performs data communication with the third communication interface 1021, and the electrical appliance 101, besides receiving and sending data related thereto from/to the peripheral device 20, forwards data related to the battery unit 102 between the peripheral device and the battery unit 102, and forwards data related to the expansion unit 103 between the peripheral device and the expansion unit 103. Thus, a peripheral device, besides being capable of obtaining data from any client in the electrical appliance assembly 100, may send a control instruction to any client in the electrical appliance assembly 100. By the same logic, another peripheral device establishes a connection to and performs data communication with the first communication interface 1011, or establishes a connection to and performs data communication with the fifth communication interface 1031, both of which are similar to this scenario and will not be described in detail again herein.

In one embodiment, when the electrical appliance assembly 10 or 100 completes or stops data communication or data forwarding with peripheral devices, a client in the electrical appliance assembly 10 or 100 that has established a communication connection to a peripheral device will be disconnected from the peripheral device. Events happen in which a connected client gets disconnected from a peripheral device, wherein, for example, a user sends a stop instruction to the electrical appliance assembly 10 or 100 through a peripheral device, or the set working duration of the assembly 10 or 100 has expired, or another situation occurs triggering the protection function of the assembly 10 or 100, which is not limited by the present disclosure.

In the event that a connected client is disconnected from a peripheral device, the other clients in the electrical appliance assembly 10 or 100 will also be notified to reset to their initial state before connection (namely to the state where communication with the peripheral device is enabled), so that each client in the electrical appliance assembly 10 or 100 can establish a connection to a peripheral device as needed at any time. Taking the embodiment shown in FIG. 7 as an example, under normal operating conditions, assuming that the electrical appliance 101 has established a communication connection to the peripheral device 200 and forwards communication data thereto, the communication functions of the battery unit 102 and of the expansion unit 103 are both in an off state, which means that the corresponding communication interfaces arranged on the battery unit 102 and the expansion unit 103 are both in an off state, thus preventing any conflicts from occurring during data reading and writing. When the assembly 100 needs to stop operation, the electrical appliance 101 breaks its communication connection to the peripheral device 200, and, in response to this communication connection being broken, the electrical appliance 101 sends a reset command to the other clients in the assembly, such as the battery unit 102 and the expansion unit 103, wherein an example command message is Client_reset notifying the other clients in the assembly to reset their respective communication interfaces, and at the same time, the electrical appliance 101 also resets its communication interface. Upon receiving the reset command, the other clients will turn on their respective communication functions and broadcast connection requests to the peripheral device 200, 200', or 200" through the communication interface arranged thereon, wherein the message is, for example, Mobile_ConnectRq, indicating that all the clients are in a connectable state.

With an electrical appliance assembly for multiclient networking and peripheral devices disclosed herein, firstly, a plurality of clients in the electrical appliance assembly are connectable to peripheral devices through communication interfaces arranged thereon, so that when wirelessly operating or controlling an electrical appliance assembly through peripheral devices, a user can flexibly establish wireless connections according to the conditions of the assembly or optionally, without the need to follow the hardware configuration manual of the electrical appliance assembly, which improves flexibility of use and the user experience. Secondly, the disclosed solution adopts full-duplex communication interfaces, which allows both parties involved in communication to simultaneously send and receive communication data when peripheral devices communicate with the electrical appliance assembly or when a plurality of clients in the electrical appliance assembly communicate with one another, thereby reducing latency and further improving the user experience. Thirdly, due to high networking flexibility, conflicts may occur when two or more peripheral devices simultaneously read and/or write data from/to the electrical appliance assembly during the networking process, and, with the conflict prevention mechanism disclosed herein, any conflicts that may occur when more than one peripheral device simultaneously reads data from and/or writes data to the electrical appliance assembly are prevented by preset evaluation rules of the system, which allows the entire multiclient networking system to operate more flexibly, reliably, and efficiently.

Overall, various embodiments of the present disclosure may be implemented with hardware or exclusive circuits, software, logic, or a combination thereof. Some aspects may be implemented with hardware, while some others may be implemented with firmware or software that is executable by a controller, a microprocessor, or another computing device. Although various aspects of the present disclosure are shown and described as block diagrams, flowcharts, or other graphical representations, it is comprehensible that the block diagrams, devices, systems, techniques, or methods described herein may be implemented in a non-restrictive manner with hardware, software, firmware, exclusive circuits or logic, general hardware or controllers, or other computing devices or a combination thereof.

Furthermore, although operations are described in a specific sequence, this should not be understood as requiring the described operations to be executed in the sequence shown or in succession, or requiring all the indicated operations to be executed to achieve a desired result. In some cases, multitasking or parallel processing may be advantageous. Similarly, although the details of several specific implementations are included in the above discussion, these should not be construed as any limitations on the scope of the present disclosure, but rather the description of features is only for specific embodiments. Some features described in some separate embodiments may also be executed in combination in a single embodiment. In contrast, the various features described in a single embodiment may also be implemented separately in a plurality of embodiments or in any suitable sub-combination.

While the present disclosure has been described in terms of specific structural features and/or methods and actions, it may be understood that the present disclosure, defined by the attached claims, is not necessarily limited to the specific features or actions described above. Instead, the specific features and actions described above are disclosed only as exemplary forms of implementing the claims.

The invention claimed is:

1. An electrical appliance assembly for multiclient networking, comprising an electrical appliance and a battery unit, wherein the electrical appliance is configured to obtain electric energy from the battery unit or provide electric energy to the battery unit, wherein the electrical appliance, as a first client, comprises a first communication interface and a second communication interface, wherein the first communication interface is configured to communicate with a first peripheral device, and the second communication interface is configured to communicate with the battery unit;

the battery unit, as a second client, comprises a third communication interface and a fourth communication interface, wherein the third communication interface is configured to communicate with a second peripheral device, and the fourth communication interface is configured to communicate with the electrical appliance;

wherein the electrical appliance is configured to, in response to a communication connection established with the first peripheral device, broadcast, through the second communication interface, timestamp information about a communication connection established between the electrical appliance and the first peripheral device; and the battery unit is configured to, in response to a communication connection established with the second peripheral device, broadcast, through the fourth communication interface, timestamp information about a communication connection established between the battery unit and the second peripheral device.

2. The electrical appliance assembly as claimed in claim 1, wherein the electrical appliance is configured to, in a state where the electrical appliance is connected to the first peripheral device through the first communication interface and the second communication interface is connected to the fourth communication interface, forward communication data between the first peripheral device and the battery unit;

the battery unit is configured to, in a state where the battery unit is connected to the second peripheral device through the third communication interface and the second communication interface is connected to the fourth communication interface, forward communication data between the second peripheral device and the electrical appliance.

3. The electrical appliance assembly as claimed in claim 2, wherein the electrical appliance is further configured to forward communication data received from the first communication interface to the battery unit through the second communication interface according to a destination label in the communication data received from the first communication interface, and/or forward communication data received from the second communication interface to the first peripheral device through the first communication interface according to a destination label in the communication data received from the second communication interface; the battery unit is further configured to forward communication data received from the third communication interface to the electrical appliance through the fourth communication interface according to a destination label in the communication data received from the third communication interface, and/or forward communication data received from the fourth communication interface to the second peripheral device through the third communication interface according to a destination label in the communication data received from the fourth communication interface.

4. The electrical appliance assembly as claimed in claim 2, wherein the electrical appliance assembly further comprises an expansion unit detachably installed on the electrical appliance, the expansion unit, as a third client, comprising a fifth communication interface, a sixth communication interface, and a seventh communication interface, wherein the fifth communication interface is configured to communicate with the first peripheral device the sixth communication interface is configured to communicate with the electrical appliance, and the seventh communication interface is configured to communicate with the battery unit.

5. The electrical appliance assembly as claimed in claim 4, wherein the expansion unit is configured to forward communication data between the first peripheral device and the electrical appliance in a state where the expansion unit is connected to the first peripheral device through the fifth communication interface and the sixth communication interface is connected to the second communication interface; and/or, in a state where the expansion unit is connected to the first peripheral device through the fifth communication interface and the seventh communication interface is connected to the fourth communication interface, forward communication data between the first peripheral device and the battery unit; and/or, in a state where the sixth communication interface is connected to the second communication interface and the seventh communication interface is connected to the fourth communication interface, forward communication data between the electrical appliance and the battery unit.

6. The electrical appliance assembly as claimed in claim 4, wherein the expansion unit is a sensor module, a monitoring module, a display module, a storage module, or a lighting module.

7. The electrical appliance assembly as claimed in claim 2, wherein the first communication interface and the third communication interface are wireless communication interfaces, and the second communication interface and the fourth communication interface are wired communication interfaces.

8. The electrical appliance assembly as claimed in claim 2, wherein the first communication interface, second communication interface, third communication interface, and fourth communication interface is a full-duplex communication interface.

9. The electrical appliance assembly as claimed in claim 8, wherein the full-duplex communication interface is a UART port, SPI port, Bluetooth interface, or NB-IoT interface.

10. The electrical appliance assembly as claimed in claim 2, wherein the electrical appliance includes a detachable electrical communication module, the first communication interface being arranged on the detachable electrical communication module, and/or the battery unit comprises a detachable battery communication module, the third communication interface being arranged on the detachable battery communication module.

11. The electrical appliance assembly as claimed in claim 2, wherein the electrical appliance assembly is configured to, in response to a communication connection established between a first client in the electrical appliance assembly and a first peripheral device, break communication connections established between one or more additional clients in the electrical appliance assembly and their respective peripheral devices, and/or turn off communication capability of the one or more additional clients in the electrical appliance assembly with their respective peripheral devices.

12. The electrical appliance assembly as claimed in claim 11, wherein the electrical appliance is configured to, in response to failing to receive any timestamp information sent by another client about a communication connection established between another client and the first peripheral device within a predetermined time after broadcasting timestamp information about a communication connection established between the electrical appliance and the first peripheral device, broadcast, through the second communication interface a first message notifying other clients in the electrical appliance assembly to turn off communicating with the first peripheral device; and the battery unit is configured to, in response to failing to receive any timestamp information sent by another client about a communication connection established between another client and the second peripheral device within a predetermined time after broadcasting timestamp information about a communication connection established between the battery unit and the second peripheral device, broadcast, through the fourth communication interface, a second message notifying the other clients in the electrical appliance assembly to turn off communicating with the second peripheral device.

13. The electrical appliance assembly as claimed in claim 11, wherein the electrical appliance is configured to, in response to received timestamp information sent by another client about a communication connection established between another client and the first peripheral device within a predetermined time after broadcasting timestamp information about a communication connection established between the electrical appliance and the first peripheral device, evaluate the timestamp information broadcast by the electrical appliance and the timestamp information sent by another client, and, in response to determining that the timestamp information broadcast by the electrical appliance is later than the timestamp information sent by another client, break the communication connection between the electrical appliance and the first peripheral device, and turn off a function of the electrical appliance of communicating with the first peripheral device; and the battery unit is configured to, in response to received timestamp information sent by another client about a communication connection established between another client and the second peripheral device within a predetermined time after broadcasting timestamp information about a communication connection established between the battery unit and the second peripheral device, evaluate the timestamp information broadcast by the battery unit and the timestamp information sent by another client, and, in response to determining that the timestamp information broadcast by the battery unit is later than the timestamp information sent by another client, break the communication connection between the battery unit and the second peripheral device, and turn off the function of the battery unit of communicating with the second peripheral device.

14. The electrical appliance assembly as claimed in claim 13, wherein the electrical appliance is configured to, in response to determining that the timestamp information broadcast by the electrical appliance is earlier than the timestamp information sent by another client, broadcast, through the second communication interface, a first message notifying other clients in the electrical appliance assembly to break communication connections to the first peripheral device and turn off communicating with the first peripheral device; and the battery unit is configured to, in response to determining that the timestamp information broadcast by the battery unit is earlier than the timestamp information sent by another client, broadcast, through the fourth communication interface, a second message notifying other clients in the electrical appliance assembly to break communication connections to the second peripheral device and turn off communicating with the second peripheral device.

15. The electrical appliance assembly as claimed in claim 11, wherein one client in the electrical appliance assembly is a master client configured to, in response to a communication connection established with the first peripheral device and failure to receive any timestamp information sent by another client about a communication connection established between another client and their respective peripheral device within a predetermined time after establishing the communication connection, broadcast a third message to other clients in the electrical appliance assembly, notifying same to turn off communicating with their respective peripheral device;

and other clients in the electrical appliance assembly are slave clients configured to, in response to a communication connection established with the second peripheral device, send timestamp information about a communication connection established between the slave clients and the second peripheral device to the master client.

16. The electrical appliance assembly as claimed in claim 15, wherein the master client is further configured to, in response to received timestamp information sent by the slave clients about a communication connection established with the second peripheral device within a predetermined time after establishing a communication connection to the first peripheral device, evaluate the timestamp information about a communication connection established between the master client and the first peripheral device and the timestamp information sent by the slave clients, thereby determining the client with an earliest timestamp information, and, in response to determining that the master client is the client with the earliest timestamp information, broadcast a fourth message to all the slave clients, notifying all the slave clients to break communication connections to the respective peripheral device and to turn off communicating with the respective peripheral device.

17. The electrical appliance assembly as claimed in claim 16, wherein
the master client is further configured to, in response to determining that the master client is not the client with the earliest timestamp information, break the communication connection between the master client and the first peripheral device and turn off a function of the master client of communicating with the first peripheral device.

18. The electrical appliance assembly as claimed in claim 17, wherein
the master client is further configured to, in response to determining that the master client is not the client with the earliest timestamp information, send a fifth message to the slave clients other than the one with the earliest timestamp information, notifying said other slave clients to break communication connections to the second peripheral device and turn off communicating with the second peripheral device.

19. The electrical appliance assembly as claimed in claim 11, wherein
the electrical appliance assembly is further configured to, after any client in the electrical appliance assembly forwards communication data to the first peripheral device, in response to the client that forwarded the communication data being disconnected from the first peripheral device, turn on a function of each client of communicating with the first peripheral device.

20. The electrical appliance assembly as claimed in claim 1, wherein
the electrical appliance is an electric tool, and the battery unit is configured to provide working energy to the electric tool; or
the electrical appliance is a charger configured to provide charging energy to the battery unit.

21. The first peripheral device as claimed in claim 1, wherein
the first peripheral device is configured to receive a connection request from at least one client in the electrical appliance assembly, and establish a communication connection to one client in the electrical appliance assembly according to a user instruction.

22. The first peripheral device as claimed in claim 21, wherein
the first peripheral device is configured to, in a state of having established a communication connection to one client in the electrical appliance assembly, send a communication instruction to said client to obtain data from any client in the electrical appliance assembly and/or send a control instruction to any client in the electrical appliance assembly.

23. The first peripheral device as claimed in claim 21, wherein the first peripheral device is an intelligent terminal, communication base station, or router.

24. The electrical appliance assembly as claimed in claim 1, wherein the first and second peripheral devices are the same peripheral device.

* * * * *